US007447830B2

(12) United States Patent
Yahagi

(10) Patent No.: US 7,447,830 B2
(45) Date of Patent: Nov. 4, 2008

(54) INFORMATION PROCESSING SYSTEM AND MEMORY CONTROLLER FOR CONTROLLING OPERATION OF MEMORIES

(75) Inventor: Kunihiko Yahagi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 356 days.

(21) Appl. No.: 11/365,533

(22) Filed: Mar. 2, 2006

(65) Prior Publication Data
US 2007/0033319 A1 Feb. 8, 2007

(30) Foreign Application Priority Data
Jul. 22, 2005 (JP) ............................. 2005-212922

(51) Int. Cl.
*G06F 12/00* (2006.01)
(52) U.S. Cl. ....................... 711/5; 711/167; 365/230.03
(58) Field of Classification Search ...................... 711/5, 711/167
See application file for complete search history.

(56) References Cited

U.S. PATENT DOCUMENTS

| 6,289,429 | B2 | 9/2001 | Okamoto | |
|---|---|---|---|---|
| 7,149,841 | B2* | 12/2006 | LaBerge | 711/5 |
| 2003/0088753 | A1* | 5/2003 | Ikeda et al. | 711/202 |
| 2004/0024955 | A1* | 2/2004 | Patel | 711/100 |
| 2004/0078512 | A1* | 4/2004 | Katayama et al. | 711/103 |
| 2005/0073894 | A1* | 4/2005 | Roohparvar | 365/210 |

* cited by examiner

Primary Examiner—Kevin L Ellis
Assistant Examiner—Hashem Farrokh
(74) Attorney, Agent, or Firm—Oblon, Spivak, McClelland, Maier & Neustadt, P.C.

(57) ABSTRACT

An information processing system includes a plurality of memories grouped into a first memory group and a second memory group, a data processor transmitting a data access request to the memories, and a memory controller controlling data transfer between the data processor and the plurality of memories. The memory controller includes an address calculation circuit calculating a second data address from a first data address included in the data access request, and a control unit controlling operation of the first and the second memory group by transmitting a first and a second control command in different clock cycles.

14 Claims, 8 Drawing Sheets

FIG. 5

| REQUEST | DATA | |
|---|---|---|
| Req (A[0,0],1) | $D_1$ (A[0,0]) | $D_0$ (A[1,0]) |
| Req (A[0,1],1) | $D_1$ (A[0,1]) | $D_0$ (A[1,1]) |
| Req (A[0,2],1) | $D_1$ (A[0,2]) | $D_0$ (A[1,2]) |
| Req (A[0,3],1) | $D_1$ (A[0,3]) | $D_0$ (A[1,3]) |
| Req (A[1,0],1) | $D_1$ (A[1,0]) | $D_0$ (A[2,0]) |
| Req (A[1,1],1) | $D_1$ (A[1,1]) | $D_0$ (A[2,1]) |
| Req (A[1,2],1) | $D_1$ (A[1,2]) | $D_0$ (A[2,2]) |
| Req (A[1,3],1) | $D_1$ (A[1,3]) | $D_0$ (A[2,3]) |

FIG. 7

| REQUEST | DATA | |
|---|---|---|
| Req (A[0,0]) | D₀ (A[0,0]) | D₁ (A[0,0]) |
| Req (A[0,1]) | D₀ (A[0,1]) | D₁ (A[0,1]) |
| Req (A[0,2]) | D₀ (A[0,2]) | D₁ (A[0,2]) |
| Req (A[0,3]) | D₀ (A[0,3]) | D₁ (A[0,3]) |
| Req (A[1,0]) | D₀ (A[1,0]) | D₁ (A[1,0]) |
| Req (A[1,1]) | D₀ (A[1,1]) | D₁ (A[1,1]) |
| Req (A[1,2]) | D₀ (A[1,2]) | D₁ (A[1,2]) |
| Req (A[1,3]) | D₀ (A[1,3]) | D₁ (A[1,3]) |
| Req (A[2,0]) | D₀ (A[2,0]) | D₁ (A[2,0]) |
| Req (A[2,1]) | D₀ (A[2,1]) | D₁ (A[2,1]) |
| Req (A[2,2]) | D₀ (A[2,2]) | D₁ (A[2,2]) |
| Req (A[2,3]) | D₀ (A[2,3]) | D₁ (A[2,3]) |

US 7,447,830 B2

INFORMATION PROCESSING SYSTEM AND MEMORY CONTROLLER FOR CONTROLLING OPERATION OF MEMORIES

CROSS REFERENCE TO RELATED APPLICATIONS AND INCORPORATION BY REFERENCE

This application is based upon and claims the benefit of priority from prior Japanese Patent Application P2005-212922 filed on Jul. 22, 2005; the entire contents of which are incorporated by reference herein.

BACKGROUND OF THE INVENTION

1. Field of the Invention

The present invention relates to memory control technology, particularly for an information processing system and a memory controller for controlling operation of a plurality of memories.

2. Description of the Related Art

A control signal and a data address signal to be transmitted to a memory from a system large scale integrated circuit (LSI) are often shared by a plurality of memories, so as to decrease the number of pins of a system LSI. In such case, a memory controller of the system LSI accesses the same data address in a plurality of memories in the same clock cycle.

In the case of a synchronous dynamic random access memory (SDRAM), when a data processor of the system LSI issues a request Req(A) to the memory controller using a memory access request signal, the memory controller issues a command Cmd(A) (where A denotes data address hereafter) to the memory using a control and data address signal. The command Cmd(A) specifies a reading or writing operation. In the case of an SDRAM, the request Req(A) and the command Cmd(A) may be used for transmission of a burst length of data for the SDRAM.

In the case of the SDRAM, the command Cmd(A) may include a plurality of commands, such as a precharge command, an activate command, a write command, and a read command. Note that each single command Cmd(A) can include at most only one of each of the commands. Either the write command or the read command is always included in the command Cmd(A).

For example, if the command Cmd(A) is transmitted from the memory controller to memory 0 and memory 1, data $D_0(A)$ is then transferred between the memory 0 and the memory controller via a memory 0 data signal in response to the command Cmd(A). In addition, data $D_1(A)$ is transferred between the memory 1 and the memory controller via a memory 1 data signal. In such case, the data $D_0(A)$ and the data $D_1(A)$ are transferred in the same clock cycle. In addition, the data $D_0(A)$ and the data $D_1(A)$ are transferred between the data processor and the memory controller using a request data signal in the same clock cycle.

Accordingly, even if the data processor requests only the data $D_0(A)$ stored in the memory 0, the data $D_1(A)$ of the data address A is also read from the memory 1. In other words, reading unnecessary data $D_1(A)$ increases the necessary number of access clock cycles in response to a request from the data processor.

To solve the aforementioned problems, there is a method of specifying a data address in each memory by connecting address lines to each of the memories so as to prevent unnecessary data from being read. However, such connection of a plurality of address lines increases the number of pins of the system LSI.

SUMMARY OF THE INVENTION

An aspect of the present invention inheres in an information processing system. The system includes a plurality of memories to be grouped into a first memory group and a second memory group; a data processor configured to transmit a data access request to the plurality of memories; and a memory controller configured to control data transfer between the data processor and the plurality of memories. The memory controller includes an address calculation circuit configured to calculate a second data address from a first data address included in the data access request; and a control unit configured to control operation of the first memory group including the first data address to be accessed and operation of the second memory group including the second data address to be accessed, by transmitting a first control command to the first memory group and a second control command to the second memory group in different clock cycles, respectively.

Another aspect of the present invention inheres in a memory controller for controlling operation of a plurality of memories, the plurality of memories being grouped into first and second memory groups. The memory controller includes an address calculation circuit configured to calculate a second data address for accessing the second memory group from a first data address for accessing the first memory group; and a control unit configured to control operation of the first memory group and operation of the second memory group, by transmitting a first control command to the first memory group and a second control command to the second memory group in different clock cycles, respectively.

BRIEF DESCRIPTION OF DRAWINGS

FIG. 5 is a table showing requests required for data processing carried out by the information processing system according to the embodiment of the present invention and data to be read in response to respective requests;

FIG. 7 is a table showing requests required for data processing according to the related art and data to be read in response to respective requests;

DETAILED DESCRIPTION OF THE INVENTION

Figure 1:
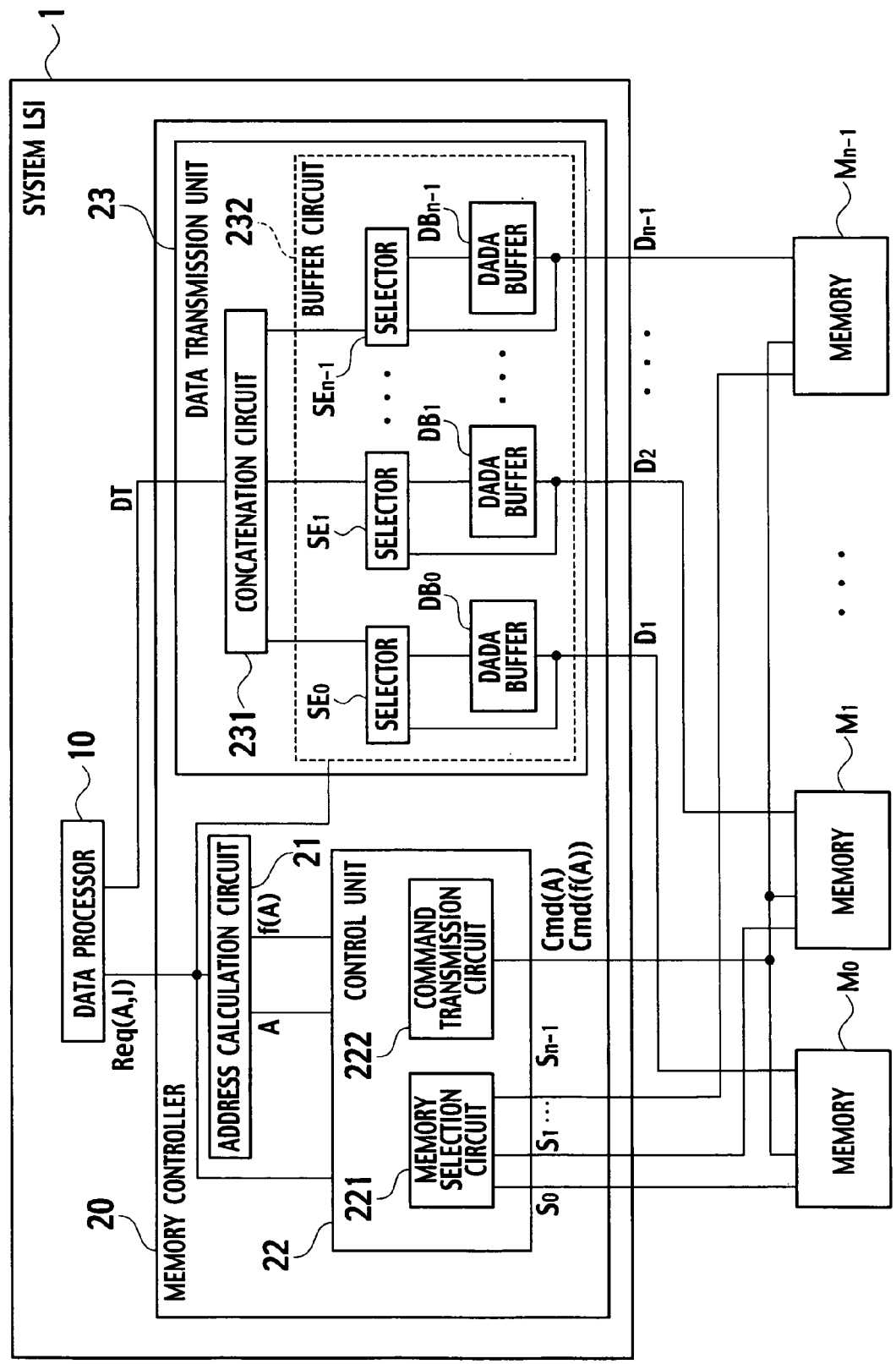
FIG. 1 schematically shows a structure of an information processing system according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set forth such as specific signal values, etc., to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

As shown in FIG. 1, an information processing system according to the embodiment of the present invention includes memories $M_0$ through $M_{n-1}$, which are grouped into a first memory group G1 and a second memory group G2, a data processor 10, and a memory controller 20, which controls operation of the memories $M_0$ through $M_{n-1}$ (where n denotes an integer of two or greater).

The memory controller 20 controls data transfer between the data processor 10 and the respective memories $M_0$ through $M_{n-1}$. As shown in FIG. 1, a system LSI 1 includes the data processor 10 and the memory controller 20. The data processor 10 and the memory controller 20 are integrated on the same chip. The memories $M_0$ through $M_{n-1}$ may be an SDRAM or the like. Here, it is assumed that subscripts of the memories $M_0$ through $M_{n-1}$ denote memory numbers, respectively. For example, the number of the memory $M_0$ is zero.

The data processor 10 transmits a request Req(A, I) to the memory controller 20 via a memory access request signal as a request to access the memories Mo through $M_{n-1}$. The request Req(A, I) includes a first data address A, and select number I as select information. 'Select information' is provided based on addresses in the respective memories $M_0$ through $M_{n-1}$ which store data required by the data processor 10. As described later, the memories $M_0$ through $M_{n-1}$ are grouped into memory groups, based on the select information. In other words, the select information indicates the memory group G1 or G2 to which each of the memories $M_0$ through $M_{n-1}$ is grouped.

The memory controller 20 receives the request Req(A, I) including the first data address A. The memory controller 20 includes an address calculation circuit 21, a control unit 22, and a data transmission unit 23.

The address calculation circuit 21 calculates a second data address f(A) for accessing the second memory group G2 from the first data address A for accessing the first memory group G1. The control unit 22 transmits a first control command Cmd(A) for controlling operation of the first memory group G1 and a second control command Cmd(f(A)) for controlling operation of the second memory group G2 in different clock cycles, respectively. The data transmission unit 23 transmits data $D_0$ through $D_{n-1}$ between the memory controller 20 and the respective memories $M_0$ through $M_{n-1}$.

The control unit 22 includes a memory selection circuit 221 and a command transmission circuit 222. The memory selection circuit 221 enables control of each of the plurality of the memories $M_0$ through $M_{n-1}$ by one of the first control command Cmd(A) and the second control command Cmd(f(A)). The memory selection circuit 221 enables control of the first memory group G1 with the first control command Cmd(A), and enables control of the second memory group G2 with the second control command Cmd(f(A)). The command transmission circuit 222 transmits the first control command Cmd(A) to the first memory group G1, and the second control command Cmd(f(A)) to the second memory group G2, respectively.

A case where the select number I is set as follows is described forthwith. The memories $M_0$ through $M_{n-1}$ are grouped into the second memory group G2 including memories with respective memory numbers smaller than the select number I and the first memory group G1 including memories with respective memory numbers greater or equal to the select number I. In other words, it is assumed that the first memory group G1 includes the memories $M_I$ through $M_{n-1}$ having the first data address A in which data requested by the data processor 10 is stored. In addition, it is assumed that the second memory group G2 includes the memories $M_0$ through $M_{I-1}$ having the second data address f(A) in which data requested by the data processor 10 is stored.

The memory selection circuit 221 transmits memory select signals $S_I$ through $S_{n-1}$ to the respective memories $M_I$ through $M_{n-1}$ in the first memory group G1 so as to enable the first control command Cmd(A). The command transmission circuit 222 transmits the first control command Cmd(A) to the memories $M_I$ through $M_{n-1}$. As a result, data $D_I$ through $D_{n-1}$ are read from the respective memories $M_I$ through $M_{n-1}$.

Afterwards, the memory selection circuit 221 transmits memory select signals $S_0$ through $SI_{I-1}$ to the respective memories $M_0$ through $M_{I-1}$ in the second memory group G2 so as to enable the second control command Cmd(f(A)). The command transmission circuit 222 transmits the second control command Cmd(f(A)) to the memories $M_0$ through $M_{I-1}$. As a result, data $D_0$ through $D_{I-1}$ are read from the respective memories $M_0$ through $M_{I-1}$.

The data $D_I$ through $D_{n-1}$, read from the first memory group G1, are stored in respective data buffers $DB_I$ through $DB_{n-1}$ of a buffer circuit 232 of the data transmission unit 23. The data $D_0$ through $D_{I-1}$, read from the second memory group G2, are transmitted to a concatenation circuit 231 of the data transmission unit 23 via respective selectors $SE_0$ through $SE_{I-1}$ of the buffer circuit 232. The data $D_I$ through $D_{n-1}$, stored in the respective data buffers $DB_I$ through $DB_{n-1}$, are transmitted to the concatenation circuit 231 via selectors $SE_I$, through $SE_{n-1}$ of the buffer circuit 232. The concatenation circuit 231 concatenates data transmitted from the respective selectors $SE_0$ through $SE_{n-1}$, resulting in a data string DT and transmits the data string DT to the data processor 10. In other words, the concatenation circuit 231 generates the single data string DT by concatenating data $D_0$ through $D_{n-1}$, read from the respective memories $M_0$ through $M_{I-1}$.

As described above, the selectors $SE_0$ through $SE_{n-1}$ select either the data stored in the data buffers $DB_0$ through $DB_{n-1}$ or data read from the memories $M_0$ through $M_{n-1}$. According to the aforementioned example, the data $D_I$ through $D_{n-1}$ are read from the first memory group G1, and the data $D_I$ through $D_{n-1}$ are stored in the respective data buffers $DB_I$ through $DB_{n-1}$. Then, the data $D_0$ through $D_{I-1}$ are read from the second memory group G2. When the data $D_0$ through $D_{I-1}$ are read, the selectors $SE_0$ through $SE_{I-1}$ select the respective data $D_I$ through $D_{n-1}$, read from the second memory group G2, and the selectors $SE_I$, through $SE_{n-1}$ select the respective data $D_I$ through $D_{n-1}$ stored in the respective data buffers $DB_0$ through $DB_{I-1}$.

On the other hand, if the data $D_0$ through $D_{I-1}$ are read from the second memory group G2 first and then the data $D_I$ through $D_{n-1}$ are read from the first memory group G1, the selectors $SE_0$ through $SE_{I-1}$ select the respective data $D_0$ through $D_{I-1}$ stored in the respective data buffers $DB_0$ through $DB_{I-1}$, and the selectors $SE_I$ through $SE_{n-1}$ select the respective data $D_I$ through $D_{n-1}$ read from the first memory group. In other words, the selectors $SE_0$ through $SE_{n-1}$ determine data to be selected for each of the first memory group G1 and the second memory group G2 by referring to the select information. The request Req(A, I) is transmitted to the buffer circuit 232 so that the selectors $SE_0$ through $SE_{n-1}$ determine data to be selected.

An example of applying the information processing system shown in FIG. 1 to two-dimensional data processing, such as H264 decoding, is described forthwith. 'Two-dimensional data' denotes image data deployed on a virtual area in a matrix.

Figure 2:
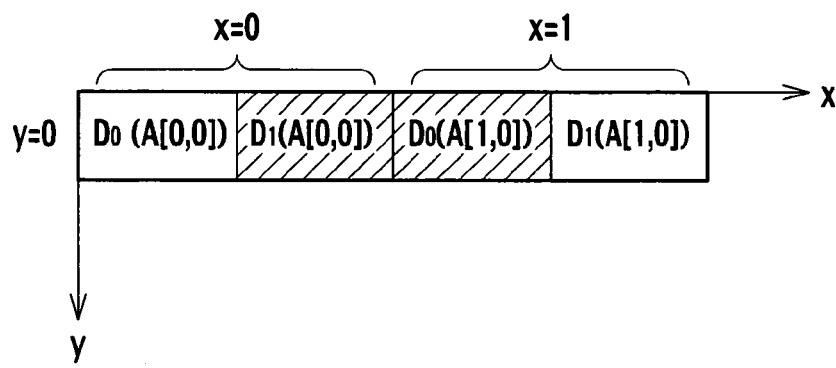
FIG. 2 schematically shows exemplary data processed by the information processing system according to the embodiment of the present invention.

FIG. 2 shows exemplary two-dimensional data. The two-dimensional data shown in FIG. 2 is data including data $D_0(A[0, 0])$, $D_1(A[0, 0])$, $D_0(A[1, 0])$, and $D_1(A[1, 0])$ of y=0 arranged along the x axis. Subscripts of 'D' indicate the memory which stores the data. For example, the data $D_0(A[0, 0])$ and $D_0(A[1, 0])$ are stored in the memory $M_0$, and the data $D_1(A[0,0])$ and $D_1(A[1,0])$ are stored in the memory $M_1$. The nomenclature '[0, 0]', as in address A[0, 0], denotes the coordinates of two-dimensional data. For example, the data $D_0(A[0, 0])$ denotes data of the coordinates (0, 0) stored in the memory $M_0$. The two-dimensional data of the coordinates (x, y) shown in FIG. 2 includes data $D_0(A[x, y])$ and $D_1(A[x, y])$. Data of the same coordinates are stored in the same address in the memories $M_0$ and $M_1$.

A case where the data processor 10, shown in FIG. 1, requests the 'data $D_0(A[0, 0])$ and the data $D_0(A[1, 0])$', shaded in FIG. 2, is described forthwith. The address calculation circuit 21 calculates a second data address f(A[x, y]) from a first data address A[x, y] using a function given in Equation (1):

$$f(A[x, y]) = A[x+1, y] \quad (1)$$

The data processor 10 transmits a request Req(A[0, 0], 1) to the memory controller 20. The address calculation circuit 21 calculates a second data address A[1, 0] (=f(A[0, 0])) from a first data address A[0, 0] using Equation (1). The control unit 22 receives the first data address A[0, 0] and the second data address A[1, 0].

The control unit 22 groups the memories $M_0$ and $M_1$ into groups, based on the first data address A[0, 0], the second data address A[1, 0], and the select number I=1. As a result, the memory $M_1$ is grouped into the first memory group G1 including the first data address A[0, 0] to be accessed, and the memory $M_0$ is grouped into the second memory group G2 including the second data address A[1, 0] to be accessed.

The memory selection circuit 221 transmits a memory select signal $S_1$ to the memory $M_1$ in the first memory group G1. The command transmission circuit 222 transmits the first control command Cmd(A[0, 0]) to the memory $M_1$. As a result, the data $D_1$ stored in the address A[0, 0] of the memory $M_1$ is transferred to the data buffer $DB_1$.

Afterwards, the memory selection circuit 221 transmits a memory select signal $S_0$ to the memory $M_0$ in the second memory group G2. The command transmission circuit 222 transmits the second control command Cmd(A[1, 0]) to the memory $M_1$. As a result, the data $D_0$ stored in the address A[1, 0] of the memory $M_0$ is transferred to the concatenation circuit 231 via the selector $SE_0$. In addition, the data $D_1$ stored in the data buffer $DB_1$ is transferred to the concatenation circuit 231 via the selector $SE_1$. The concatenation circuit 231 transmits the data string DT including the data $D_0$ and the data $D_1$ to the data processor 10.

For comparison, an example of reading the data $D_1(A[0, 0])$ and $D_0(A[1, 0])$, shown in FIG. 2, as performed by the related art is given forthwith. According to the related art, the data $D_0(A[0, 0])$ and $D_1(A[0,0])$ are transferred in response to a request Req(A[0, 0]). The data $D_0(A[1, 0])$ and $D_1(A[1, 0])$ are transferred in response to a request Req(A[1, 0]).

As described above, according to the related art, data of the same coordinates stored in the same address in the memories $M_0$ and $M_1$ are read in response to a single request. Therefore, the data $D_0(A[0, 0])$ and $D_1(A[1, 0])$, which are not requested by the data processor, are transferred.

On the other hand, the information processing system, shown in FIG. 1, read data in different addresses in the memories $M_0$ and $M_1$ in response to a single request. As a result, use of the information processing system, shown in FIG. 1, decreases processing time in comparison of the related art, for data read processing in response to a request from the data processor 10.

Figure 3:
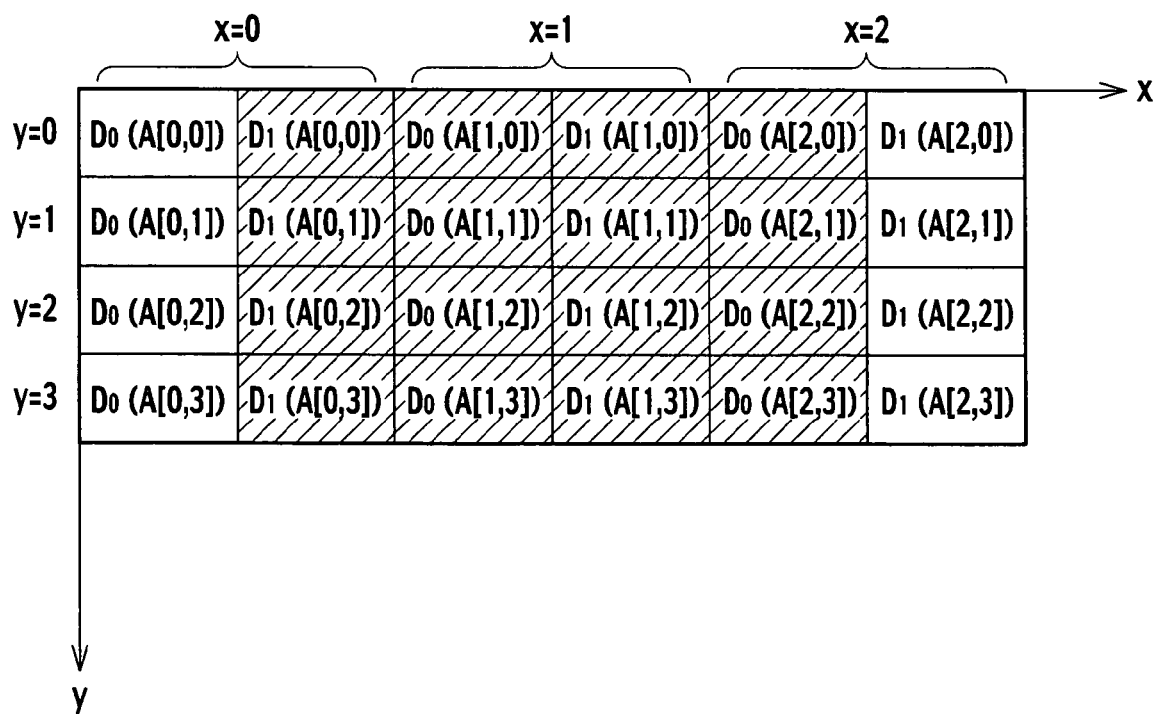
FIG. 3 schematically shows another exemplary data processed by the information processing system according to the embodiment of the present invention.

Next, an example of applying the information processing system, shown in FIG. 1, to processing of two-dimensional data, shown in FIG. 3, is described forthwith. The structure of the two-dimensional data shown in FIG. 3 includes four data in the y direction and three data in the x direction. In addition, data of the coordinates (x, y) includes data $D_0(A[x, y])$ stored in the memory $M_0$ and data $D_1(A[x, y])$ stored in the memory $M_1$. A case where the data processor 10 requests 'data $D_1(A[0, j])$ and data $D_0(A[1, j])$', and 'data $D_1(A[1, j])$ and data $D_0(A[2, j])$' (where j=0 to 3), shown as shaded in FIG. 3, is described forthwith.

The data processor 10 sequentially transmits requests Req(A[0, j], 1) and Req(A[1, j], 1) to the memory controller 20 so as to read the shaded data in FIG. 3. The select number I is one. Then, the memory $M_1$ is grouped in the first memory group G1 including the first data address A[0, j] to be accessed, and the memory $M_0$ is grouped in the second memory group G2 including the second data address A[1, j] to be accessed. The second data address A[1, j] is calculated using Equation (1).

Figure 4:
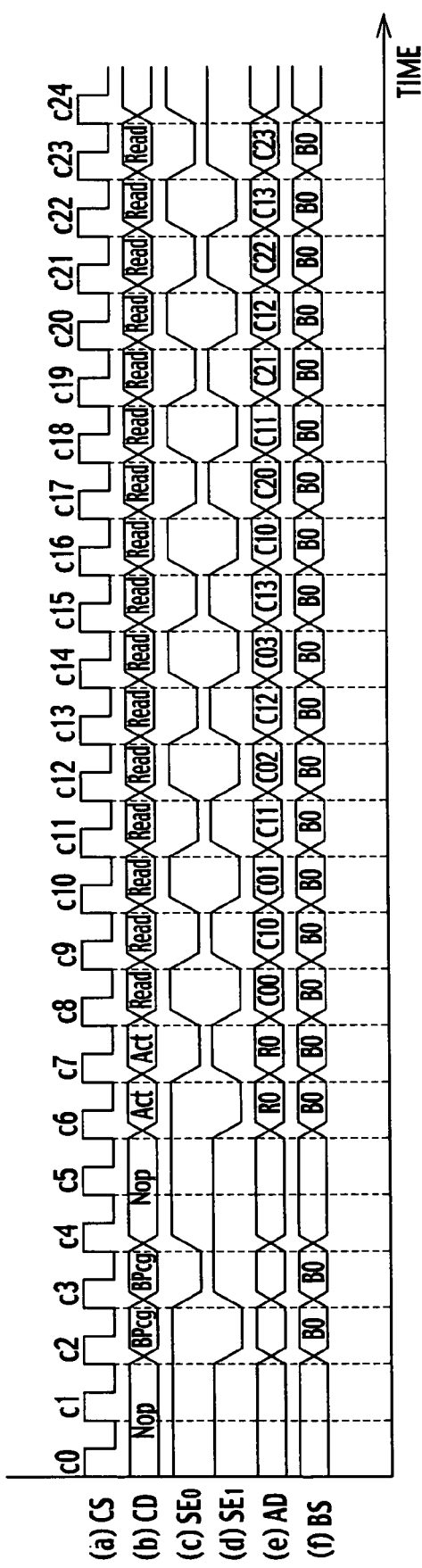
FIG. 4 shows a timing chart explaining data processing carried out by the information processing system according to the embodiment of the present invention.

The operation of the memory controller 20 is described using a timing chart shown in FIG. 4. Note that it is assumed that the memories $M_0$ and $M_1$ are a double data rate two (DDR2) SDRAM (hereafter, referred to as 'DDR2 memory'). It is also assumed that an address A[x, y] includes a row address R[x, y], a bank select B[x, y], and a column address C[x, y] of the DDR2 memory. Furthermore, it is assumed that the row address R[x, y]=R0 and the bank select B[x, y]=B0 when x=0 to 2, and y=0 to 3 as shown in FIG. 3.

In FIG. 4, the signal CS is a system clock signal for the information processing system shown in FIG. 1. The memory select signals $SE_0$ and $SE_1$ have high level and low level respectively, and the memory select signals $SE_0$ and $SE_1$ are low active signals. In other words, when the memory select signal $SE_0$ is low level, the second control command Cmd(f(A)) for controlling the memory $M_0$ is enabled. On the other hand, when the memory select signal $SE_1$ is low level, the first control command Cmd(A) for controlling the memory $M_1$ is enabled.

In FIG. 4, when the memory select signal $SE_0$ is low level, signal CD indicates the second control command Cmd(f(A)), and when the memory select signal $SE_1$ is low level, the signal CD indicates the first control command Cmd(A). Command BPcg is a bank precharge command; command Act is an activate command; command Read is a read command; and command Writ is a write command. Note that in FIG. 4, 'Nop' denotes 'no operation'.

In FIG. 4, signal AD denotes a column and a row address. 'Cxy' of the signal AD denotes a column address C[x, y]. Signal BS denotes a bank select signal. In the case of the SDRAM, a command and an address are transferred via a single signal in conformity with the first control command Cmd(A). However, for clarity, the commands BPcg, Act, Read, and Writ and addresses are shown independently in FIG. 4. Note that in the timing chart shown in FIG. 4, bank select is always B0.

In clock cycle c2 of FIG. 4, the memory select signal $SE_1$ is low level, and the command BPcg is issued at the same time, resulting in precharging the memory $M_1$. In clock cycle c3, the memory select signal $SE_0$ is low level, and the command BPcg is issued at the same time, resulting in precharging the memory $M_0$.

In clock cycle c6, the memory select signal $SE_1$ is low level, and the command Act is issued at the same time, resulting in activating bank B0 and row address R0 of the memory $M_1$. In clock cycle c7, the memory select signal $SE_0$ is low level, and the command Act is issued at the same time, resulting in activating bank B0 and row address R0 of the memory $M_0$.

In clock cycle c8, the memory select signal $SE_1$ is low level. The command Read is transmitted to the memory $M_1$ as the first control command Cmd(A[0, 0]) in response to a request Req(A[0, 0], 1). As a result, in clock cycle c8, an operation of reading data from the column address C[0, 0] of the memory $M_1$ starts. Data $D_1$ (A[0, 0]) is read from the memory $M_1$ following the column access strobe (CAS) latency of several clock cycles after clock cycle c8, and stored in the data buffer $DB_1$, which is not shown in the drawing.

In clock cycle c9, the memory select signal $SE_0$ is low level. The command Read is transmitted to the memory $M_0$ as the second control command Cmd(A[1, 0]) in response to a request Req(A[0, 0], 1). As a result, in clock cycle c9, an operation of reading data from the column address C[1, 0] of the memory $M_0$ starts. Data $D_0$(A[1, 0]) is read from the memory $M_0$ following the CAS latency of several clock cycles after the clock cycle c9, which is not shown in the drawing. The data $D_1$(A[0, 0]) and the data $D_0$(A[1, 0]) are transferred as the data string DT to the data processor 10.

Data $D_1$(A[0, 1]) is read from the memory $M_1$ in clock cycle c10, and data $D_0$(A[1, 1]) is read from the memory $M_0$ in clock cycle c11 in response to a request Req(A[0, 1], 1).

Data $D_1$(A[0, 2]) is read from the memory $M_1$ in clock cycle c12, and data $D_0$(A[1, 2]) is read from the memory $M_0$ in clock cycle c13 in response to a request Req(A[0, 2], 1).

Data $D_1$(A[0, 3]) is read from the memory $M_1$ in clock cycle c14, and data $D_0$(A[l, 3]) is read from the memory $M_0$ in clock cycle c15 in response to a request Req(A[0, 3], 1).

Similarly, data $D_0$(A[2, j]) and data $D_1$(A[1, j]) are read from the respective memories $M_1$ and $M_0$ in response to a request Req(A[1, j], 1) in clock cycles c16 through c23.

As described above, to read the shaded data in FIG. 3 from the memories $M_0$ and $M_1$ by the information processing system shown in FIG. 1, eight requests are needed, and sixteen data required by the data processor 10 are read. In other words, data not required by the data processor 10 is not read. FIG. 5 is a table showing requests required for reading the shaded data in FIG. 3 using the information processing system shown in FIG. 1, and data read in response to the respective requests.

Figure 6:
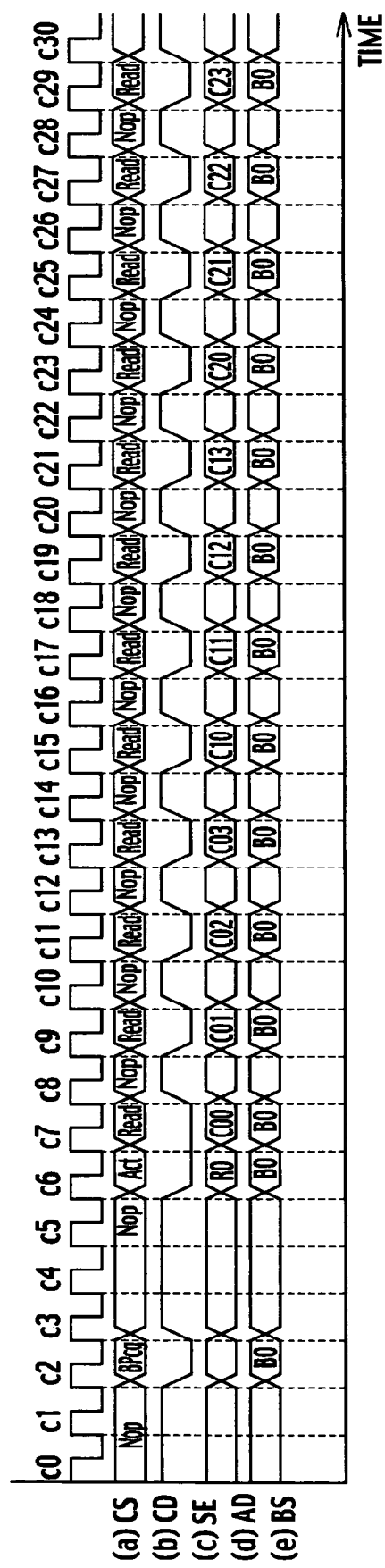
FIG. 6 shows a timing chart explaining data processing according to a related art.

On the other hand, FIG. 6 is a timing chart showing an operation of reading the shaded data in FIG. 3 from the memories $M_0$ and $M_1$ using procedures of the related art. As shown in FIG. 6, in the clock cycles cl through c13, data $D_0$(A[0, j]) and data $D_1$(A[b, j]) are read from the memories $M_0$ and $M_1$ in response to four requests Req(A[0, j]). Since the same address in the memories $M_0$ and $M_1$ is accessed in the same clock cycle, the memory select signal SE is shared by the memories $M_0$ and $M_1$.

In addition, in the clock cycles c15 through c21, data $D_0$(A [1, j]) and data $D_1$(A[1, j]) are read from the memories $M_0$ and $M_1$ in response to four requests Req(A[1, j]). In the clock cycles c23 through c29, data $D_0$(A[2, j]) and data $D_1$ (A[2, j]) are read from the memories $M_0$ and $M_1$ in response to four requests Req(A[2, j]).

FIG. 7 is a table showing requests required for reading the shaded data in FIG. 3 using procedures of the related art, and data read in response to the respective requests. As shown in FIG. 7, reading the shaded data in FIG. 3 from the memories $M_0$ and $M_1$ is completed by reading all data shown in FIG. 3 for each of the coordinates in response to twelve requests. Twenty-four data are read. In other words, use of the information processing system shown in FIG. 1 decreases four requests, and eight data to be read.

According to the information processing system shown in FIG. 1, the address to be accessed in the memory $M_0$ is different from the address in the memory $M_1$. Therefore, the commands BPcg and Act need to be transmitted to the respective memories $M_0$ and $M_1$ in different clock cycles. This causes an increase in the number of overhead clock cycles as compared to the related art. However, according to the information processing system shown in FIG.1, the number of accessed data decreases. This reduces the number of clock cycles required for accessing data on the whole.

As shown in FIG. 4, the number of clock cycles required for the data read operation by the information processing system shown in FIG. 1 is twenty-five clock cycles. On the other hand, as shown in FIG. 6, the number of clock cycles required for the data read operation according to the related art is thirty-one clock cycles.

Figure 8:
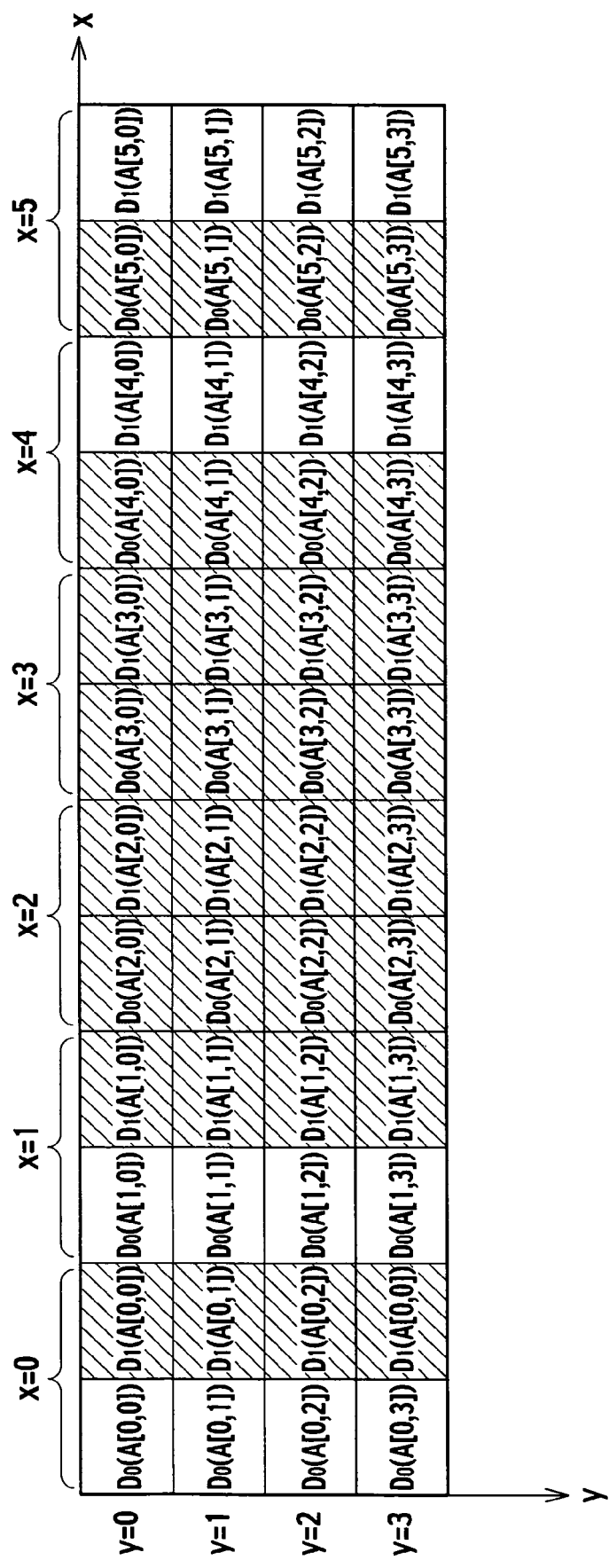
FIG. 8 schematically shows another exemplary data processed by the information processing system according to the embodiment of the present invention.

Next, an application example of the information processing system shown in FIG. 1 to processing of two-dimensional data shown in FIG. 8 is described forthwith. The structure of the two-dimensional data shown in FIG. 8 includes four data in the y direction and six data in the x direction. In addition, data of the coordinates (x, y) includes data $D_0$(A[x, y]) stored in the memory $M_0$ and data $D_1$(A[x, y]) stored in the memory $M_1$. A case where the data processor 10 requests 'data $D_1$(A [0, j]) and data $D_0$(A[2, j])', 'data $D_1$(A[1, j]) and data $D_0$(A [3, j])', 'data $D_1$(A[2, j]) and data $D_0$(A[4, j])', and 'data $D_1$(A[3, j]) and data $D_0$(A[5, j])' (where j=0 to 3), shaded in FIG. 8, is described forthwith.

The data processor 10 sequentially transmits requests Req (A[0, j], 1), Req(A[1, j], 1), Req(A[2, j], 1), and Req(A[3, j], 1) to the memory controller 20. The select number I is one. Then, the memory $M_1$ is grouped into the first memory group G1 including the first data address A[0, j] to be accessed. The memory $M_0$ is grouped into the second memory group G2 including the second data address A[2, j] to be accessed. The second data address A[2, j] is calculated using the following Equation (2):

$$f(A[x, y])=A[x+2, y] \qquad (2)$$

The memory controller 20 reads the data $D_1$(A[0, j]) and the data $D_0$(A[2, j]) from the respective memories $M_1$ and $M_0$ in response to the request Req(A[0, j], 1) transmitted to the memory controller 20 from the data processor 10.

In addition, the memory controller 20 reads the data $D_1$(A [1, j]) and the data $D_0$(A[3, j]) from the respective memories $M_1$ and $M_0$ in response to the request Req(A[1, j], 1). The memory controller 20 reads the data $D_1$(A[2, j]) and the data $D_0$(A[4, j]) from the respective memories $M_1$ and $M_0$ in response to the request Req(A[2, j], 1). The memory controller 20 reads the data $D_1$(A[3, j]) and the data $D_0$(A[5, j]) from the respective memories $M_1$ and $M_0$ in response to the request Req(A[3, j], 1).

Accordingly, the necessary number of requests for reading the data shaded in FIG. 8 is sixteen; and the number of data to be read is thirty-two. On the other hand, according to the related art, since the data processor 10 transmits requests Req(A[0, j]), Req(A[1, j]), Req(A[3, j]), Req(A[4, j]), Req(A[5, j]), and Req(A[6, j]) to the memory controller 20, all data shown in FIG. 8 need be read for each coordinates. In other words, according to the related art, the necessary number of requests is twenty-four; and the number of data to be read is forty-eight.

For example, it is assumed that the two-dimensional data shown in FIG. 8 includes data in the top field of an interlaced image for x=0, 2, or 4, and data in the bottom field of the same interlaced image for x=1, 3, or 5. The data read method using the aforementioned information processing system shown in FIG. 1 may be used in such a case.

An example of reading data from the memories $M_1$ and $M_0$ has been described above. An example where there are four memories which store data is described forthwith.

Figure 9:
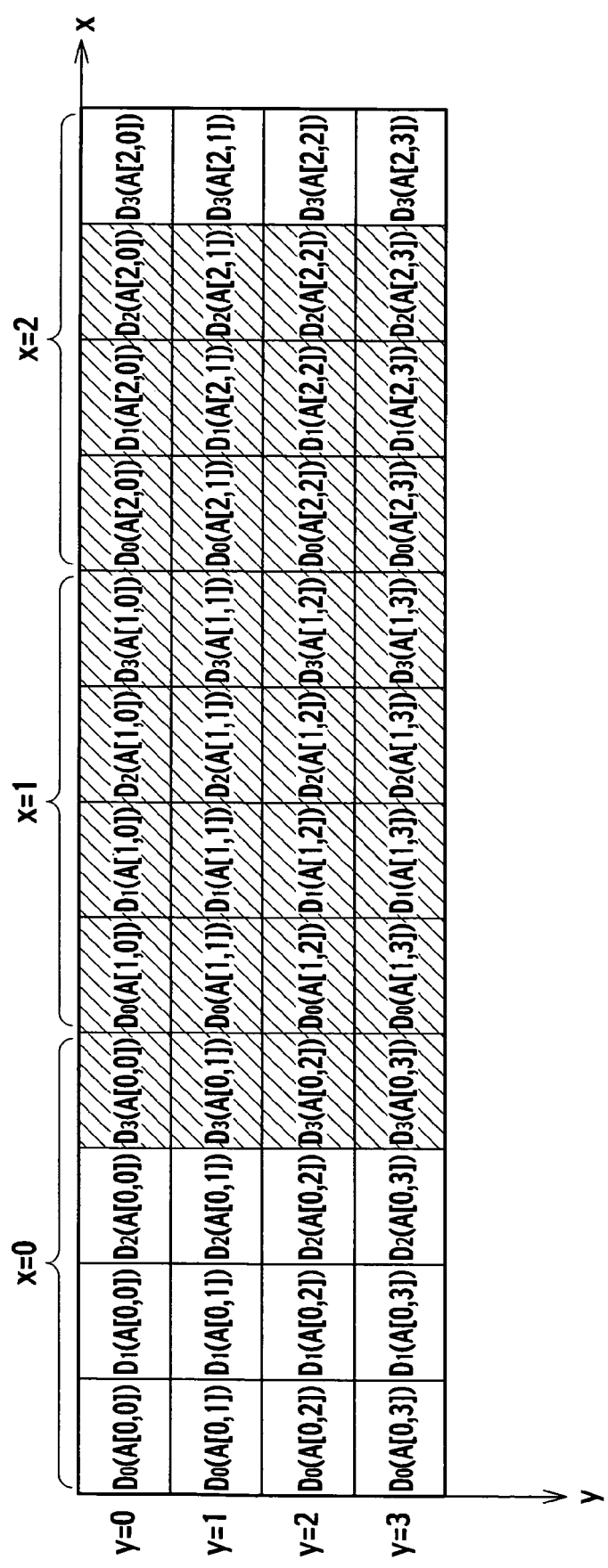
FIG. 9 schematically shows another exemplary data processed by the information processing system according to the embodiment of the present invention.

An application example of the information processing system, shown in FIG. 1, for processing of two-dimensional data, shown in FIG. 9, is described forthwith. The structure of the two-dimensional data shown in FIG. 9 includes four data in the y direction and three data in the x direction. In addition, data of the coordinates (x, y) includes data $D_0(A[x, y])$ stored in the memory $M_0$, data $D_1(A[x, y])$ stored in the memory $M_1$, data $D_2(A[x, y])$ stored in the memory $M_2$, and data $D_3(A[x, y])$ stored in the memory $M_3$. In other words, data of a single set of coordinates is divided and stored in four memories $M_0$ through $M_3$.

A case where the data processor 10 requests for 'data $D_3(A[0, j])$, data $D_0(A[1, j])$, data $D_1(A[1, j])$ and data $D_2(A[1, j])$', and 'data $D_3(A[1, j])$, data $D_0(A[2, j])$, data $D_1(A[2, j])$ and data $D_2(A[2, j])$' (where j=0 to 3), shaded in FIG. 9, is described forthwith.

The data processor 10 sequentially transmits requests Req(A[0, j], 3) and Req(A[1, j], 3) to the memory controller 20. The select number I is three. Then, the memory $M_3$ is grouped into the first memory group G1 including the first data address A[0, j] to be accessed, and the memories $M_0$, $M_1$, and $M_2$ are grouped into the second memory group G2 including the second data address A[1, j] to be accessed. The second data address A[1, j] is calculated using Equation (1).

The memory controller 20 reads the data $D_3(A[0, j])$ from the memory $M_3$ in response to the request Req(A[0, j], 3) transmitted to the memory controller 20 from the data processor 10. The data $D_3(A[0, j])$ is stored in a data buffer $DB_3$. In addition, the memory controller 20 reads the data $D_0(A[1, j])$, the data $D_1(A[1, j])$, and the data $D_2(A[1, j])$ from the respective memories $M_0$, $M_1$, and $M_2$. The data $D_0(A[1, j])$, the data $D_1(A[1, j])$, the data $D_2(A[1, j])$, and the data $D_3(A[0, j])$, which is read from the data buffer $DB_3$, are transferred to the concatenation circuit 231, and then transferred as a data string DT to the data processor 10.

The memory controller 20 reads the data $D_3(A[1, j])$ from the memory $M_3$ in response to the request Req(A[1, j], 3). In addition, the memory controller 20 reads the data $D_0(A[2, j])$, the data $D_1(A[2, j])$, and the data $D2(A[2, j])$ from the respective memories $M_0$, $M_1$, and $M_2$.

Accordingly, the necessary number of requests for reading the data shaded in FIG. 9 is eight; and the number of data to be read is thirty-two. On the other hand, according to the related art, since the data processor 10 transmits requests Req(A[0, j]), Req(A[1, j]), and Req(A[2, j]) to the memory controller 20, all data shown in FIG. 9 need to be read for each set of coordinates. In other words, according to the related art, the necessary number of requests is twelve; and the number of data to be read is forty-eight.

As described above, according to the information processing system of the embodiment of the present invention, the second data address is calculated from the first data address, and memories $M_0$ through $M_{n-1}$ are accessed for each of the first and the second data addresses. Accordingly, data stored in different addresses in the memories $M_0$ through $M_{n-1}$ may be accessed in response to a single request from the data processor 10. As a result, since it is unnecessary to access data not required by the data processor 10, the time required for accessing the memories $M_0$ through $M_{n-1}$ may be decreased. In addition, an increase in the number of pins of the system LSI 1 shown in FIG. 1, compared to the related art, is only the number of pins required for transmitting memory select signals $S_0$ through $S_{I-1}$ to the respective memories $M_0$ through $M_{n-1}$. This process prevents an increase in the number of pins of the system LSI 1, as compared to the case of connecting a plurality of address lines to transmit addresses to the memories $M_0$ through $M_{n-1}$.

OTHER EMBODIMENTS

According to the aforementioned embodiment, the first control command Cmd(A) and the second control command Cmd(f(A)) are transmitted to the first memory group G1 and the second memory group G2, respectively, in consecutive clock cycles. Alternatively, the first and second control commands may be transmitted at intervals of two clock cycles or more.

Various modifications will become possible for those skilled in the art after receiving the teachings of the present disclosure without departing from the scope thereof.

What is claimed is:

1. An information processing system, comprising:
    a plurality of memories to be grouped into a first memory group and a second memory group;
    a data processor configured to transmit a data access request to the plurality of memories; and
    a memory controller configured to control data transfer between the data processor and the plurality of memories, comprising:
        an address calculation circuit configured to calculate a second data address from a first data address included in the data access request;
        a control unit configured to control operation of the first memory group including the first data address to be accessed and operation of the second memory group including the second data address to be accessed, by transmitting a first control command to the first memory group and a second control command to the second memory group in different clock cycles, respectively; and
        a data transmission unit configured to transmit data between the memory controller and the plurality of memories, comprising:
            a plurality of data buffers configured to store data transmitted from the plurality of memories; and
            a plurality of selectors configured to select one of data transmitted from the plurality of memories and data transmitted from the plurality of data buffers, for each of the plurality of memories.

2. The system of claim 1, wherein the control unit comprises:
    a memory selection circuit configured to enable control of each of the plurality of memories by one of the first control command and the second control command.

3. The system of claim 2, wherein the memory selection circuit transmits a memory select signal, which enables the first and the second control command, to the plurality of memories.

4. The system of claim 3, wherein the memory selection circuit transmits the memory select signal to the first memory group and the second memory group in different clock cycles.

5. The system of claim 1, wherein the plurality of selectors select data for each of the first and the second memory groups.

6. The system of claim 1, wherein the data transmission unit further comprises a concatenation circuit configured to concatenate data transmitted from the plurality of selectors into a data string.

7. The system of claim 1, wherein the data access request includes select information indicating which one of the first memory group and the second memory group that each of the plurality of memories is grouped.

8. A memory controller for controlling operation of a plurality of memories, the plurality of memories being grouped into first and second memory groups, comprising:
  an address calculation circuit configured to calculate a second data address for accessing the second memory group from a first data address for accessing the first memory group;
  a control unit configured to control operation of the first memory group and operation of the second memory group, by transmitting a first control command to the first memory group and a second control command to the second memory group in different clock cycles, respectively; and
  a data transmission unit configured to transmit data between the memory controller and the plurality of memories, comprising:
    a plurality of data buffers configured to store data transmitted from the plurality of memories; and
    a plurality of selectors configured to select one of data transmitted from the plurality of memories and data transmitted from the plurality of data buffers, for each of the plurality of memories.

9. The memory controller of claim 8, wherein the control unit comprises a memory selection circuit configured to enable control of each of the plurality of memories by one of the first control command and the second control command.

10. The memory controller of claim 9, wherein the memory selection circuit transmits a memory select signal, which enables the first and the second control command, to the plurality of memories.

11. The memory controller of claim 10, wherein the memory selection circuit transmits the memory select signal to the first memory group and the second memory group in different clock cycles.

12. The memory controller of claim 8, wherein the plurality of selectors select data for each of the first and the second memory groups.

13. The memory controller of claim 8, wherein the data transmission unit further comprises a concatenation circuit configured to concatenate data transmitted from the plurality of selectors into a data string.

14. The memory controller of claim 8, wherein the data is two-dimensional data deployed on a virtual area in a matrix.

* * * * *